United States Patent [19]
Jeppesen, III et al.

[11] Patent Number: 5,355,468
[45] Date of Patent: Oct. 11, 1994

[54] SYSTEM FOR HALTING SYNCHRONOUS DIGITAL MODULES

[75] Inventors: James H. Jeppesen, III, Lake Forest; Bruce E. Whittaker, Mission Viejo, both of Calif.

[73] Assignee: Unisys Corporation, Blue Bell, Pa.

[21] Appl. No.: 864,111

[22] Filed: Apr. 6, 1992

[51] Int. Cl.⁵ .................. G06F 11/22; H03K 17/26
[52] U.S. Cl. ........................... 395/550; 364/271.2
[58] Field of Search ............... 395/550; 364/749, 269, 364/271.2

[56] References Cited

U.S. PATENT DOCUMENTS

| | | | |
|---|---|---|---|
| 4,636,656 | 1/1987 | Snowden et al. | 307/267 |
| 4,720,811 | 1/1988 | Yamaguchi et al. | 364/900 |
| 5,021,950 | 6/1991 | Nishikawa | 364/200 |

Primary Examiner—Dale M. Shaw
Assistant Examiner—Fran F. Faller
Attorney, Agent, or Firm—Alfred W. Kozak; Mark T. Starr; Stanton D. Weinstein

[57] ABSTRACT

In a system of multiple digital modules which is operated synchronously via common clock means, there is provided circuitry for halting each module at the same simultaneously clock-moment after sensing of a selected condition in any one of the digital modules.

7 Claims, 6 Drawing Sheets

SYSTEM FOR HALTING SYNCHRONOUS DIGITAL MODULES

FIELD OF THE INVENTION

This disclosure involves a system for simultaneous stopping and halting multiple digital modules in a high speed synchronous computer system to prevent loss of valuable data and system state information.

BACKGROUND OF THE INVENTION

In the field of digital technology, it is quite common to have systems operating on a synchronous basis with intercommunication with a multiplicity of digital modules. As operations proceed, each of the digital modules will contain various pieces of information being handled or processed and also containing data on the various control states of each of the modules.

These systems modules may consist of multiple numbers of processors, memory units and input/output units as is commonly provided in computer system networks.

In a synchronous system, all system modules will operate on the same system clock source, that is to say, all the system clocks are at the same frequency and operated synchronously.

As the multiple modules communicate with each other and process and manage their own individual data, each of the modules contains various valuable pieces of information data. For example, there are registers containing data words and program instruction words. Further, each module will operate in various control states as evidenced by numerous control flip-flops (which may number in the thousands) and which will be on/off in millions of possible combinations. The appropriate and proper combination of the control flip-flops is called the "control state of the module". All state and data information is actually vital to the proper execution of the overall system operation. Not only is this data necessary for proper computer operations, but also it is necessary for testing the hardware and for hardware and software problem-fixing and general system maintenance.

As often occurs, the entire system network and the various modules must be shutdown or turned off in order to stop the handling or processing of information data in each module. When a stop condition is signalled, it is mandatory that all modules should stop simultaneously on the same clock pulse. Any failure to stop each module at the same moment in time would lead to data corruption, lost data and inaccurate data. The failure to stop each of the modules altogether at the same moment would be analogous to having a four cylinder engine which was shutdown, but one piston of the four cylinder engine would have kept on moving while the other pistons would have stopped. In this case, the engine would not be any longer usable in a recoverable condition after such a disorderly stop.

Likewise, in a multiple digital module system, any inconsistency in the time moments of stopping in the various modules could lead to very severe consequences, as mentioned, of lost data and of data corruption and loss of information as to various state conditions of the individual modules.

The present invention is devoted to providing means in multiple digital module systems whereby the stopping or halting operation can be done neatly, quickly, efficiently and, at the same moment of time in order to preserve all the data information integrity and state condition information in each of the modules so that an orderly stop will have occurred and so that subsequently a start up can be done in an orderly fashion.

SUMMARY OF THE INVENTION

The system described herein provides for a technique and hardware means for permitting reliable and predictable and accurate stopping or halting of each system module in a system network of digital modules.

The Event logic in each digital module is provided to be responsive to hold signals which freeze each respective system module. Freezing a module means that the module is no longer running in its normal manner. The hold signals are originated from the maintenance control logic of the system.

A Freeze signal comes from the event logic in a system module for transmission to the maintenance logic. The event logic can be programmed to the detect numerous errors or conditions within its own module and can send the freeze indicator signal to the system maintenance control unit which will insure that all modules are halted at the exact same clock moment. This is accomplished by deleting the second clock pulse occurring after detection of an error which triggers a Freeze signal. The typical type of errors or conditions that are detected may include: Micro-code parity; operator boundaries; clock count number; micro-code address data, etc.

BRIEF DESCRIPTION OF THE DRAWINGS

FIG. 6 is a drawing showing how the Event Control intercooperates with the digital module it is associated with.

DESCRIPTION OF PREFERRED EMBODIMENT

Figure 1:
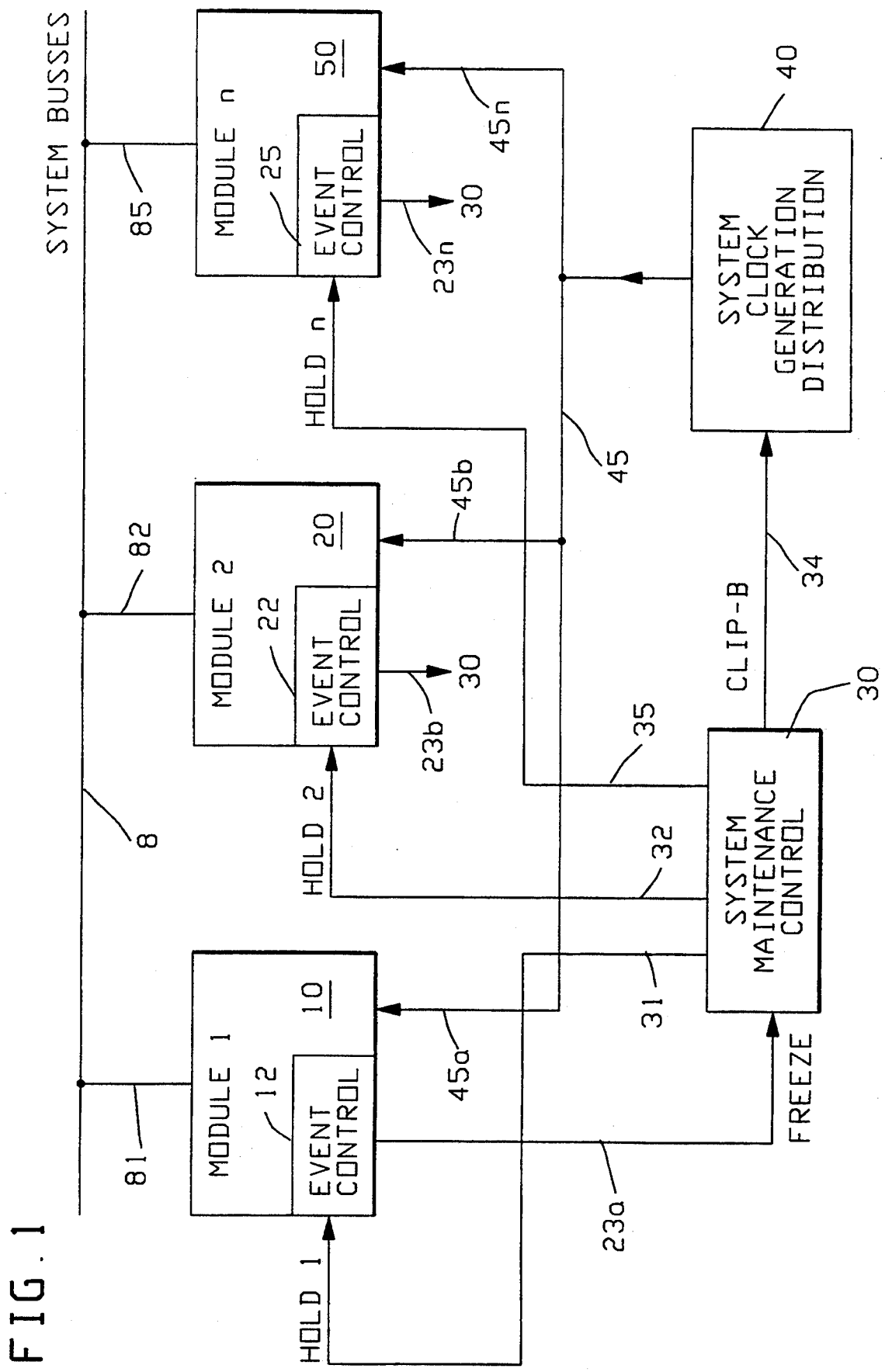
FIG. 1 is a block diagram of a multiple module system interconnected to provide accurate means for halting each module simultaneously.

Referring to FIG. 1, there is a seen a digital system having modules 1 through "n" as shown involving the first module 10, the second module 20 and the final module 50. A common system bus 8 connects via legs 81, 82 and 85 to each of the modules. Each of the modules have an event control logic unit designated respectively as 12 (for module 10), event control 22 (for module 20) and event control logic 25 (for module 50).

A system clock distribution unit 40 connects via line 45 to distribute clock signals to each of the modules 10, 20, and 50.

The event control unit 12 uses line 23a to provide a freeze signal to the system maintenance control 30, after which the system maintenance control 30 can provide hold signals on lines 31, 32, and 35 to each of the modules to halt operations in each of the digital modules.

The system maintenance control 30 also provides a clip signal (CLIP_B) on line 34 to the system clock distribution unit 40.

As seen in FIG. 1, there is provided a typical large multi-processor computer system. Here the multiple modules may share a common system bus or buses 8 and will communicate with each other over this bus connection.

These system modules of FIG. 1 may consist of either processors, memory units and input/output units and so on. One usable embodiment in the Unisys A6-S computer system uses up to four processors in addition to memory units and input/output units.

A single system clock source is provided by the system clock distribution unit 40 which provides clock signals to all of the modules 10, 20 and 50.

Each of the modules 10, 20, . . . 50, etc., contain registers containing data words and program instruction words. Additionally, each of these modules may have hundreds or thousands of control flip-flops which will be in various control states.

In the present described embodiment each of the modules 10, 20, . . . 50, will have an event control logic unit shown as respectively 12, 22, 25, in FIG. 1, with freeze lines $32_a$, $23_b$ . . . $23_n$ connected to system control 30.

This event logic is special maintenance hardware which is built into each of the various system modules and which can be used to detect possible module errors. Additionally, this event logic can then also be used to stop or halt the system in such a manner as to preserve all of the data and state conditions in the module for each module of the system in order to resolve any problems of imprecise halting in any of the modules.

Thus, with the present system, provision is made that when the stop condition is signaled, each of the modules will stop simultaneously and together at the same clock moment.

As seen in FIG. 1 there are special control signals which are used to signal the halt condition to each of the system modules. The Hold signals on lines 31, 32, and 35 are used to halt each respective system module. This holding or freezing of the module indicates that the module is no longer running in a normal manner, but has now been halted from its normal operation. The HOLD signals are also indicated as HOLD number 1 for the module 10, as HOLD number 2 for module 20 and HOLD "n" for module "n" designated in the drawing as module 50.

Another significant function of the system is the generation of a "freeze" signal which is generated by a system modules event control logic over to the system maintenance control unit 30. As indicated in FIG. 1 there is a single freeze signal on line $23_a$ coming from the event control logic 12 of module 10 over to the system maintenance control unit 30. However, this can be replicated in each of the modules so that the event control logic of each system module 20 . . . 50 can also provide a freeze signal ($23_b$, $23_n$) to the system maintenance control unit 30.

The event control logic units 12, 22, . . . 25 can be programmed to detect any errors or unstable conditions within its particular module and as a result thereof generate the freeze indication signal to the system maintenance control unit 30.

Each of the event control logic units (12, 22, . . . 25) may use gating circuitry, such as an NOR gate (FIG. 5), having multiple sense-signal inputs to generate a Freeze signal output upon activating of any one of the sense-signal inputs.

Additionally, the event control logic may include a counter which is preset by the maintenance controller 30. Upon the occurrence of a particular number of activated sense signal inputs which correspond to the counter setting, the Freeze signal will be generated. Thus an analysis can be made of the results in a certain time frame of operation occurring just before the entire system is halted.

When an error condition is detected by the event control logic in a particular module, the freeze indicator signal is activated and passed on to the system maintenance control logic unit 30. This, in turn, generates and distributes the "hold" signals on lines 31, 32, and 35 to each of the system modules.

In order to preserve the system data and module-state at the instant of the error, all modules must be arranged to stop together at the same moment. It is here that a problem arises in that potential unpredictability and discontinuity is possible.

If it should happen that 1 (or more) modules gets its "Hold" signal too late for it to reliably stop on the designated clock moment, then that particular module may run additional clock time and may lose vital state information. Additionally, proper error evaluation may then be hindered or lost as well as the inability to properly restart the system module as part of the overall system operation.

Figure 2:
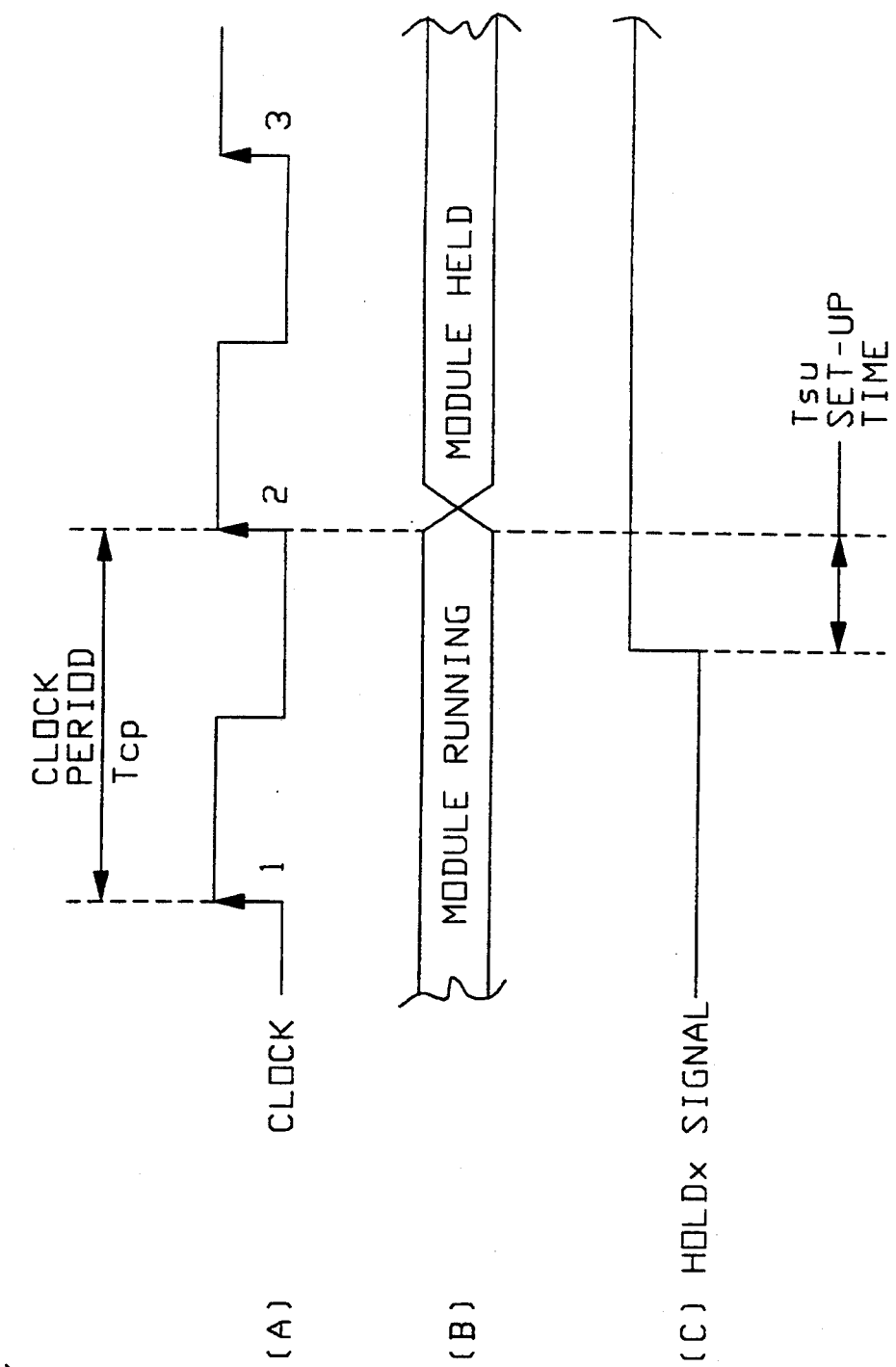
FIG. 2 is a time diagram showing the hold signal set up time.

The problem of delay or discontinuity may occur as may be indicated in FIG. 2. Here, line A shows the clock pulse periods. Line B shows when the module is running and when the module has halted. Line C shows the hold signal timing and the set up time required for activation.

In FIG. 2, each module will be seen to act on the active edge (rising of the clock pulses). When the incoming hold signal is activated, it must be distributed to each and every one of the digital module units (which use clocked elements) before the elements act on the next active edge. Since all clocked logic elements (flip-flops, registers, counters, etc.) have an inherent set-up time, it must be considered also that these set-up times may vary greatly within an individual digital module.

The set-up time is a time "before" an active clock edge that a signal must be applied, in order to provide for predictably reliable activation or operation. The times may range from a few nanoseconds to 85 nanoseconds for some gate arrays and microprocessors.

Thus, for any given digital module, it is necessary to pick out the worst case (longest) set-up time within that module.

Referring to FIG. 2, it may be noted that to reliably stop a module, the HOLD signal must reach the module earlier than "$T_{su}$" nanoseconds before the active clock edge.

Figure 3:
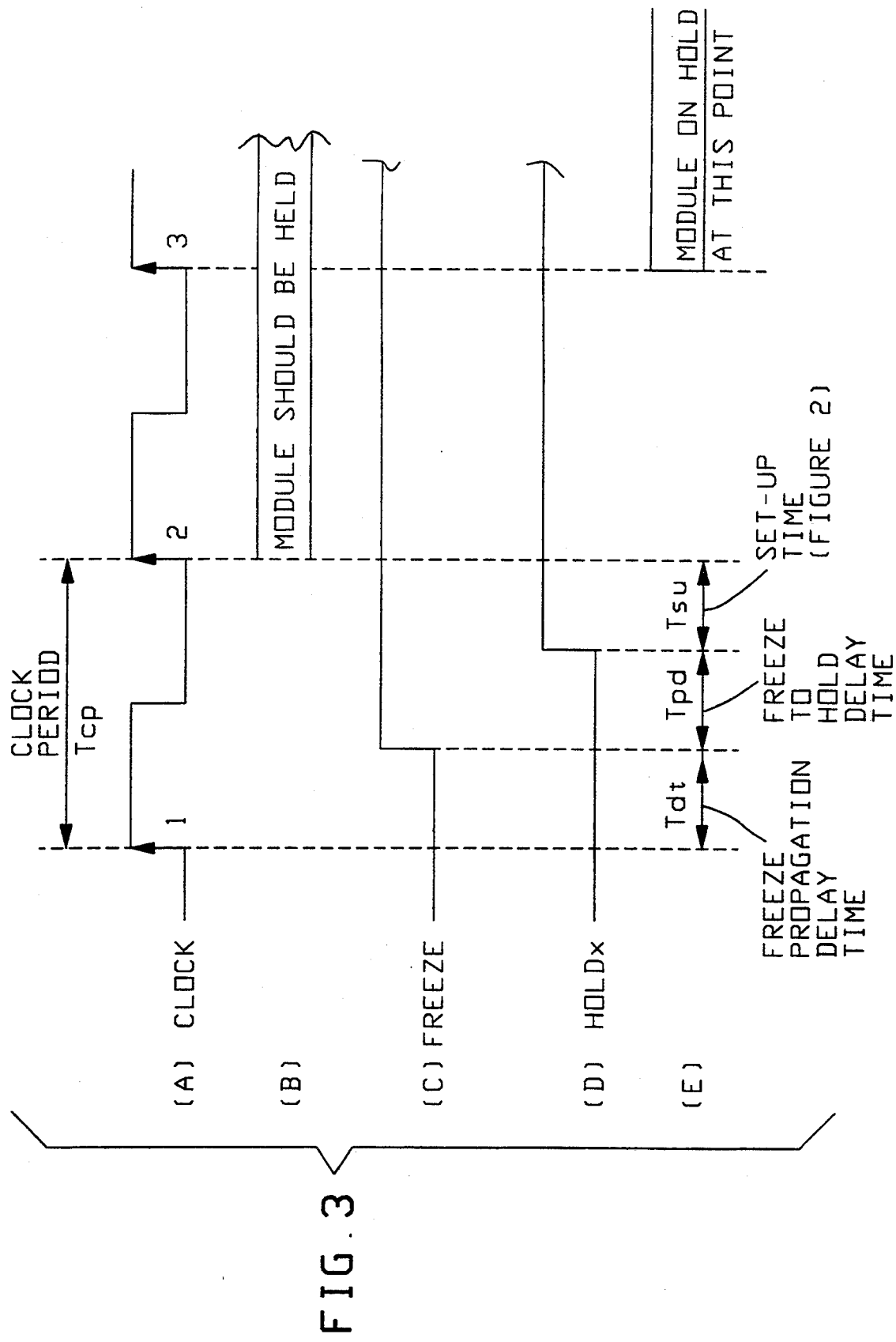
FIG. 3 is a timing diagram illustrating the delay time between the freeze and the hold signals.

FIG. 3 shows the occurrence of a problem between the freeze signal and the hold delay time. Line A shows the clock pulses. Line B shows the moment that the module should be halted or held to a stop. Line C shows the freeze signal, while line D shows the Hold signal.

In FIG. 3, there is indicated the freeze signal which also must be propagated to the system maintenance control unit 30 (of FIG. 1) with a delay time indicated as "$T_{dt}$" from a clock edge. The maintenance logic 30 must build and distribute all of the Hold signals to the various modules within a time period indicated as $T_{pd}$. The clock period in line A is shown as $T_{cp}$.

Thus, the problem arises if Tsu is greater than the combination ($T_{cp}$ minus $T_{dt}$ minus $T_{pd}$), then the digital module may not be held into a halted or stopped condition at the next rising clock pulse.

The reference $T_{pd}$ is the delay time from freeze—to hold period. Thus, by consideration of FIG. 2 and 3, the problem will arise such that if $T_{su}$ is greater than ($T_{cp}$ minus $T_{dt}$ minus $T_{pd}$), then the particular digital module involved cannot be predictably and reliably stopped at the desired moment of time designated by the clock signal.

This problem can also be stated in the following manner:

If the worst case (longest) set-up time ($T_{su}$) is greater than the time quantity made up of the clock time period ($T_{cp}$) minus the delay time ($T_{dt}$) minus the propagation time ($T_{pd}$), then that module may not be stopped in a predictable and accurate fashion.

As will be seen and noted in FIGS. 2 and 3, the digital system modules were intended to stop at clock time 2 (as indicated in the lines A and B of FIG. 3). Now this would be feasible if $T_{su}$ is "less than" the sum of ($T_{cp} - T_{dt} - T_{pd}$). However, in some cases, the time period $T_{su}$ is greater than the sum of ($T_{cp} - T_{dt} - T_{pd}$), and these modules will then not be halted till the "clock 3" time as seen in line E of FIG. 3. When this occurs, it can be seen that some digital modules may be held to halt at clock time 2 and others may be halted at clock time 3. The system is now out of synchronization, status or state information may be lost, and the system may now not be able to be restarted successfully to continue its previous operations.

Figure 4:
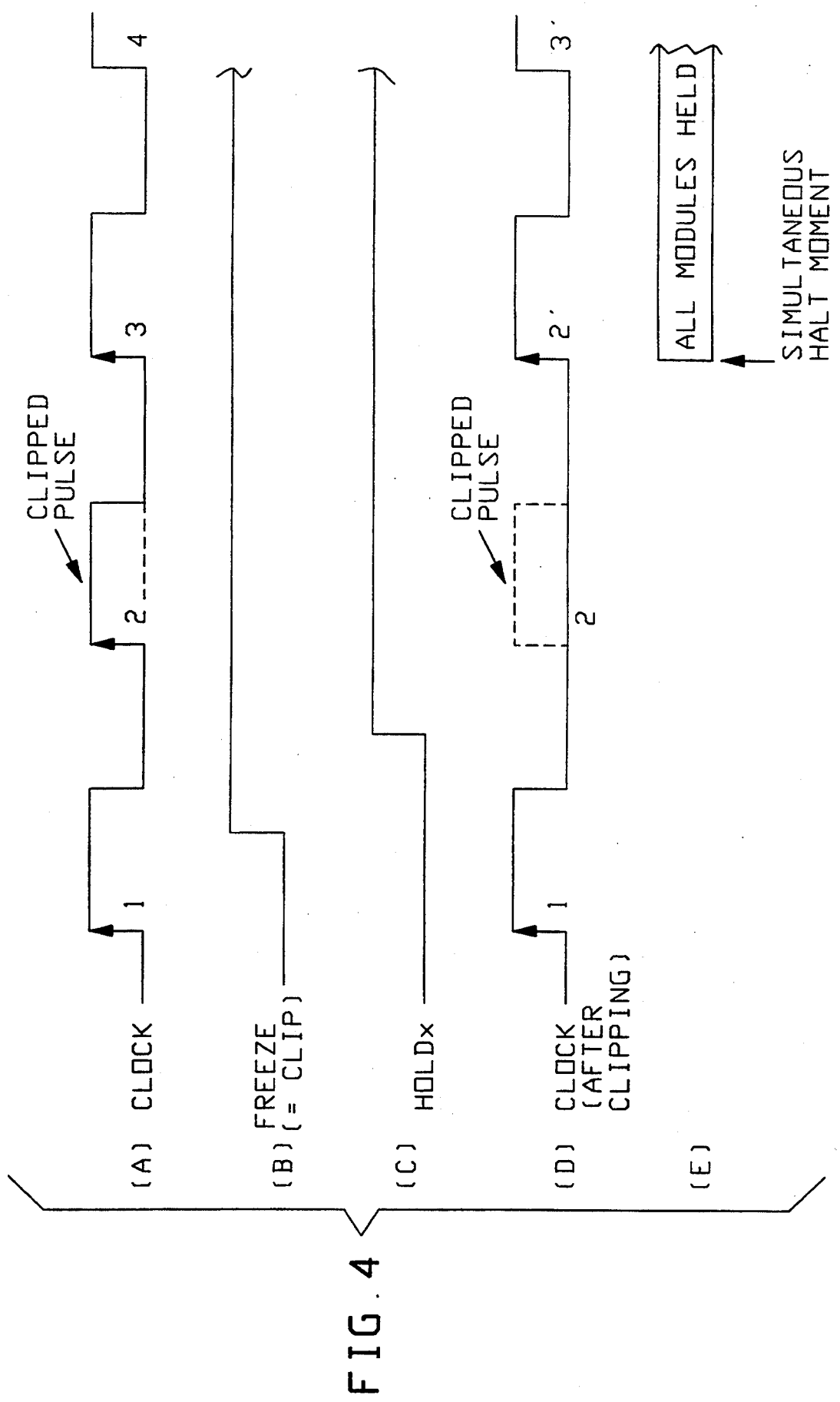
FIG. 4 is a timing diagram showing the use of the clock pulse clipper to manage simultaneous shutoff times.

The presently described system has been provided with means to handle this unfortunate situation. Now referring to FIG. 1, there will be seen a newly-inserted signal designated "clip" (CLIP_B) which is provided from the system maintenance controller unit 30 to the system clock distribution unit 40 by means of line 34. FIG. 4 is a timing diagram showing how the present disclosure becomes effective in handling the unpredictability situation. Line A shows the clock pulses. Line B shows the freeze signal (equal to CLIP). Line C shows the HOLD signal, while line D shows the result in clock signal after clipping has occurred. Line E shows the moment where all modules have been halted and held.

The clip signal on line 34 of FIG. 1 is derived directly from the freeze indicator signal on line $23_a$ (or any of the other freeze signals from other event control units in the system) and the freeze indicator signal is used to generate a clip signal which is used to "clip" or "remove" the next clock pulse to all of the digital system modules.

By removing the clock pulse, as seen in line D of FIG. 4, the time between active clock edges (that is to say, the rising edges) is extended. This increases the effective clock period ($T_{cp}$) by an extra Tcp time period, thus, the period in the equation of the "problem" then changes as follows to:

If Tsu is greater than (2 $T_{cp}$ minus $T_{dt}$ minus $T_{pd}$), then the module cannot be predictably and reliably halted.

Thus, by removing the second clock pulse on line A of FIG. 4, and which is shown in line D of FIG. 4, it will be seen that there is a new second clock pulse designated 2' at which time all of the modules are shutdown or halted at the same instant, which to say corresponding to line A of FIG. 4 at the number 3 clock pulse rising side.

Figure 5:
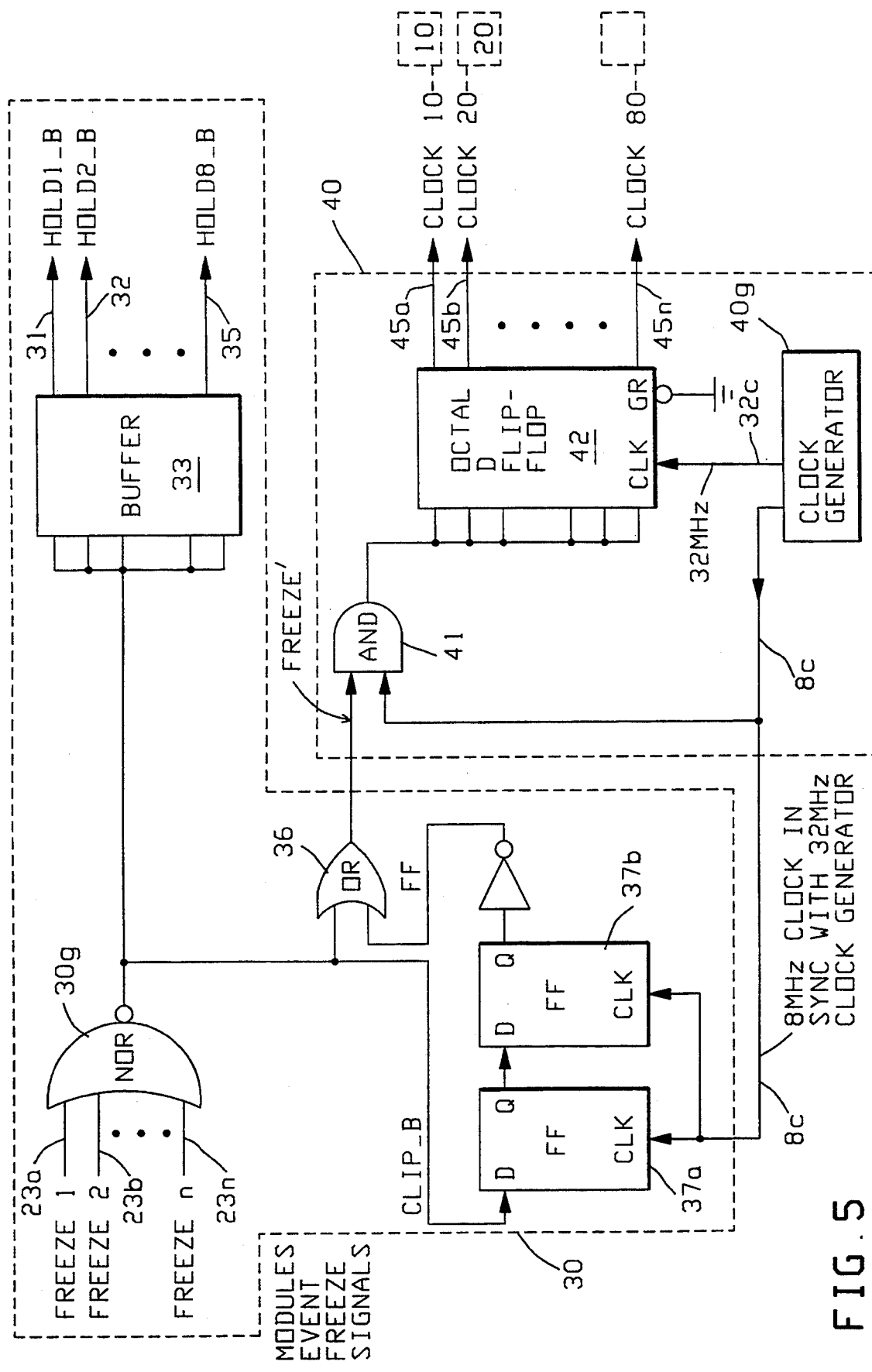
FIG. 5 is a block diagram showing the event logic unit in each module.

Referring to FIG. 5, there is seen the logic circuitry in the system maintenance controller 30 and in the system clock distribution unit 40.

As seen in FIG. 5, the system maintenance controller 30 includes a NOR gate $30_g$ into which are fed a series of lines $23_a$, $23_b$, $23_c$, ... $23_n$ which carry the freeze signal from each event control unit (12, 22 ... 50) of each of the digital modules 10, 20, ... 50. The output of the NOR gate $30_g$ is fed through a buffer unit 33 which provides the hold signal outputs designated 31, 32, ... 35 which provide the hold signal to each individual event control logic units of each of the individual modules 10, 20, ... 50 (FIG. 1).

The system maintenance controller 30 also includes the OR gate 36 and the flip-flops 37a and 37b which work in order to provide an output from the OR gate 36 designated as the signal CLIP_B. This clip signal feeds to the AND gate 41 in the clock distribution unit 40. The output of the AND gate 41 is fed to the octal D flip-flop 42 which provides a series of individual clock signals $45_a$, $45_b$, $45_c$, ... $45_n$ which feed the system clock signals to each individual digital module (1, 2, 3, ... n).

Under normal operation, Freeze is low, inactive. With Freeze low, HOLD$_X$_B is high (lines 31-35, FIG. 5), inactive, and the clocks, CLOCK10 ... CLOCK80, are transmitted to the various modules, 10, 20, ... 50. These clocks are skew controlled by the D Flips-Flops $37_a$, $37_b$ in FIG. 5.

When a Freeze signal (on lines $23a$, $23b$, ... $23n$) is received from one of the digital modules, the NOR gate ($30g$) output goes low, active, and CLIP_B is forced low by the OR gate 36 output, and HOLD$_X$B is sent to all modules in the system through Buffer 33 which drives the signal with sufficient drive to produce a "clean" signal, that is to say, a low noise signal.

When CLIP_B is low, the 8 Mhz clock on line 8c cannot pass through the AND gate 41 to the D Flip-Flop 42. Thus, the CLOCK$_{XX}$$45a$, $45b$, ... $45n$ signals will remain low. The D Flip-Flop 37a also receives the CLIP_B signal. When CLIP_B is low, the D Flip-Flop 37a latches the level of CLIP_B on the first clock 1 (of FIG. 4) and the D Flip flop 37b latches the output of D Flip-Flop 37a on the second clock 2 (of FIG. 4). The time between the first and second clock is one cycle, during which the CLOCK$_{XX}$ outputs stay low. FIG. 4 shows the timing diagram. The D Flip-Flop 42 is fed a 32 MHZ clock on line 32c from clock generator 40 which is in sync with the 8 MHZ clock on line 8c.

Thus, when a particular freeze signal activates the transmittal of a CLIP_B signal, this will generate a series of clock signals (on lines 45a, 45b ... 45n, FIG. 1) to each individual digital module, which clock signals will operate as shown in FIG. 4 where the second positive clock pulse will be deleted (clipped out) to delay simultaneous halting of modules until the rise time designated 2' as seen in FIG. 4, line D. At that moment, shown at 2' in FIG. 4, there will occur the simultaneous halting of all digital modules as indicated on Line E of FIG. 4, thus preserving all data and status signals at the exact same moment.

Figure 6:
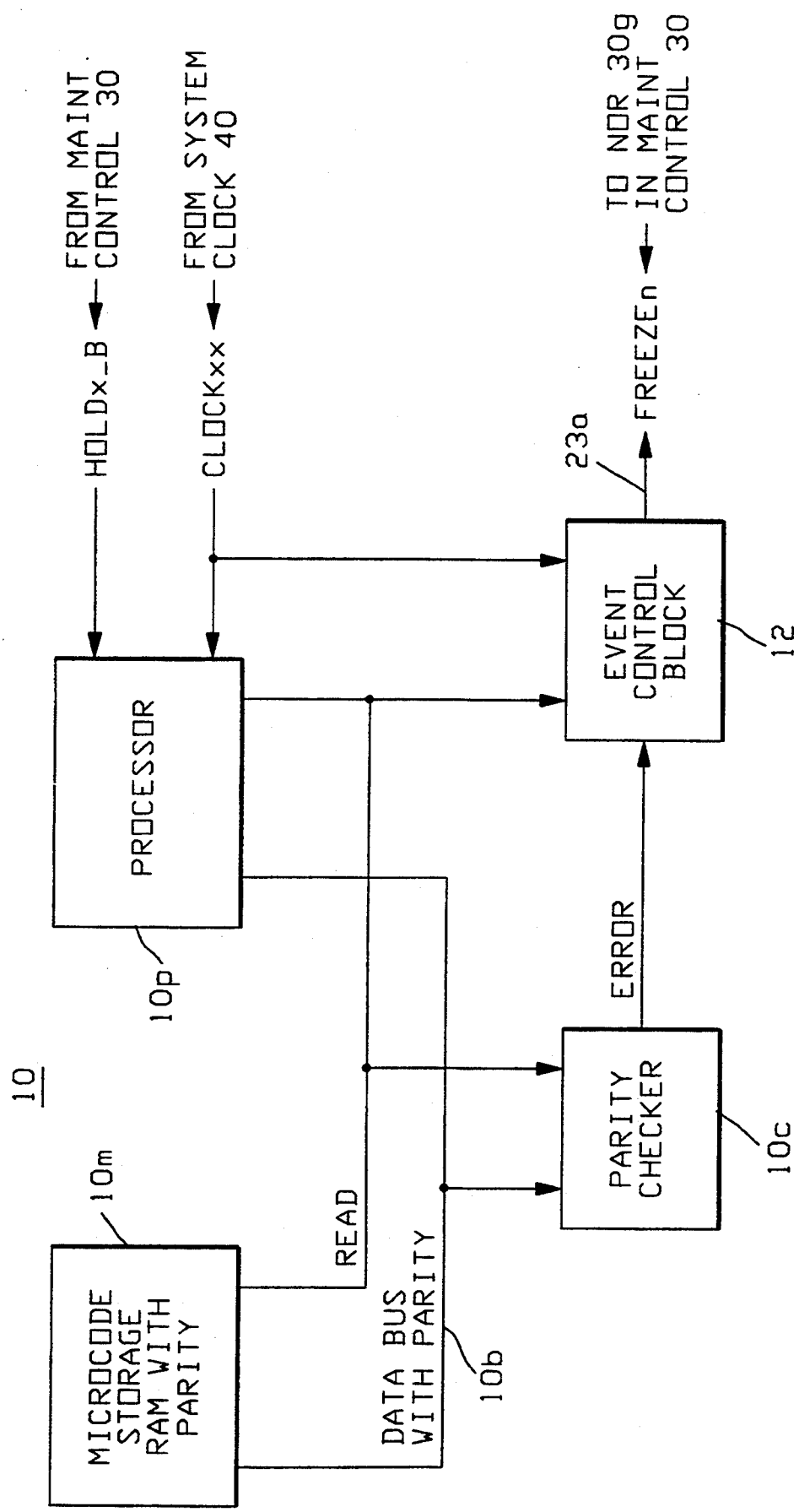

FIG. 6 is a block diagram indicating how a parity error, during the accessing of microcode, will cause the halting of a digital module, such as module 10 of FIG. 1 and also halt modules 20 ... 50.

The processor 10p may access and read instruction microcode from RAM 10m onto bus 10b. The parity check circuit 10c will check parity, and if a parity error occurs, will signal the Event Control block 12. The Event Control Block 12 will send a Freeze signal on line 23a to NOR gate 30g in the System Maintenance Controller 30. This will initiate the transmission of the HOLD1_B signal (FIG. 5) onto the processor 10p for subsequent halt at the same clock moment that digital modules 20, 30 . . . 50 are halted.

Described herein has been a system of synchronously operating digital modules which have intercooperating circuitry whereby any error detection or irregularity in any of the digital modules will be operative to shut down and halt all of the modules in the system at the same clock moment thus preventing loss of data and status conditions in the modules and also preserving all data and status conditions at the same stop-moment so that subsequent start-up will recapture all needful and appropriate data without loss.

While the present invention is described in its preferred embodiment, the invention may be implemented with other formats which still utilize the inventive concept defined in the following claims.

What is claimed is:

1. In a system of interconnected multiple digital modules synchronously clocked from a common system clock means, a method for halting each digital module at the same clock moment comprising the steps of:
   (a) sensing, in each digital module, any selected conditions or errors;
   (b) generating a "freeze" signal to a maintenance control unit upon sensing said selected condition or error;
   (c) transmitting HOLD signals to each said digital module from said maintenance control unit;
   (d) generating, via said maintenance control unit, a momentary disabling signal to said common system clock means to obviate one clock pulse permitting all setup and transmission delay times to run out so that said HOLD signals will halt each digital module on the next rising clock pulse just after the obviated pulse, wherein the halt functions to suspend all logical conditions in each digital module at the same moment in time.

2. In a system of intercommunicating digital modules, a system for halting each module simultaneously comprising:
   (a) a plurality of digital modules operating synchronously from a common clock means, each said module including:
      (a1) event control logic means for sensing any error condition or shutdown condition required in the module and including;
      (a2) means to generate a freeze signal to a system maintenance control means when an error or shutdown condition is detected;
   (b) said maintenance control means for receiving said freeze signal from any one of said event control logic means and including:
      (b1) means to transmit a hold signal to each of said digital modles;
      (b2) means to activate a delay circuit which will transmit a disable signal, for one clock period, to a flip-flop means;
      (b3) means to simultaneously suspend operation of the circuitry in each said digital module on the rise of the next clock following said deleted clock, said suspended operation thus maintaining all logic conditions at the moment of suspension;
   (c) said flip-flop means for receiving said one-clock disable signal and deleting the transmission of one clock signal after occurrence of said freeze and hold signals;
   (d) said common clock means for generating normal clock pulses for synchronous operation of each digital module.

3. The system of claim 2 wherein said common clock means generates said normal clock pulses at a rate of "K" MHZ, and further includes:
   (i) auxiliary maintenance clock generation means for synchronizing a multiplicity of flip-flops in said flip-flop means.

4. The system of claim 3 wherein said auxiliary maintenance clock generation means operates at a rate of 4K MHZ or greater.

5. The system of claim 2 wherein said event control logic means includes:
   (a) gating means for receiving a plurality of sense signals within said digital module, and for generating a Freeze signal upon activation of any one of said sense signals.

6. The system of claim 5 wherein said event control logic means further includes:
   (a) counter means, preset by said system maintenance controller means, and connected to said gating means, for simultaneously halting said plurality of digital modules upon counting said present number of sense signals, said simultaneous halting functioning to suspend the state of all logical circuitry in each of said digital modules.

7. In a system of interconnected multiple digital modules synchronously clocked from a common system clock means, a network for suspending the logical states of circuitry in each digital module simultaneously at the same moment in time, said network comprising:
   (a) a plurality of digital modules operating synchronously from a common clock means, each said digital module including:
      (a1) event control logic means for sensing any error or shutdown condition in said digital module;
      (a2) means to transmit a freeze signal to a system maintenance control means when an error or shutdown condition is sensed;
   (b) means to distribute a common clock signal to each of said digital modules;
   (c) said system maintenance control means including:
      (c1) means, upon receipt of said freeze signal, to disable said means to distribute for one clock period to delete one clock signal period;
      (c2) means, upon receipt of said freeze signal, to transmit a Hold signal to each said digital module;
      (c3) means to simultaneously suspend the state of logic circuitry in each digital module at the moment of the rising pulse of the clock signal occurring after said deleted clock signal period;
   (d) said common clock means for generating a common clock signal to each of said digital modules via said means to distribute a common clock signal.

* * * * *